United States Patent

Nels

[11] 4,104,900
[45] Aug. 8, 1978

[54] PROCESS FOR MAKING METAL FIBERS

[75] Inventor: Terry E. Nels, Xenia, Ohio

[73] Assignee: General Motors Corporation, Detroit, Mich.

[21] Appl. No.: 792,918

[22] Filed: May 2, 1977

[51] Int. Cl.² .............................................. B21H 8/00
[52] U.S. Cl. ....................................... 72/70; 29/4.5 R
[58] Field of Search ..................... 29/4.5 R; 407/1, 2, 407/3, 4, 5, 6; 144/186, 188; 72/70, 71, 703

[56] References Cited

U.S. PATENT DOCUMENTS

| | | | |
|---|---|---|---|
| 655,868 | 8/1900 | Holtgen | 29/4.5 R |
| 762,117 | 6/1904 | Battey | 144/186 |
| 934,335 | 9/1909 | Nahm et al. | 72/703 |
| 3,258,838 | 7/1966 | Tilton | 407/1 |

Primary Examiner—Lowell A. Larson
Attorney, Agent, or Firm—George A. Grove

[57] ABSTRACT

Metal fibers of uniform or other predetermined sizes are made by knurling a pattern of ridges and depressions on the surface of a metal workpiece. The fibers are formed by shaving the ridges from the knurled surface. The knurling-shaving process is repeated to make more fibers.

4 Claims, 5 Drawing Figures

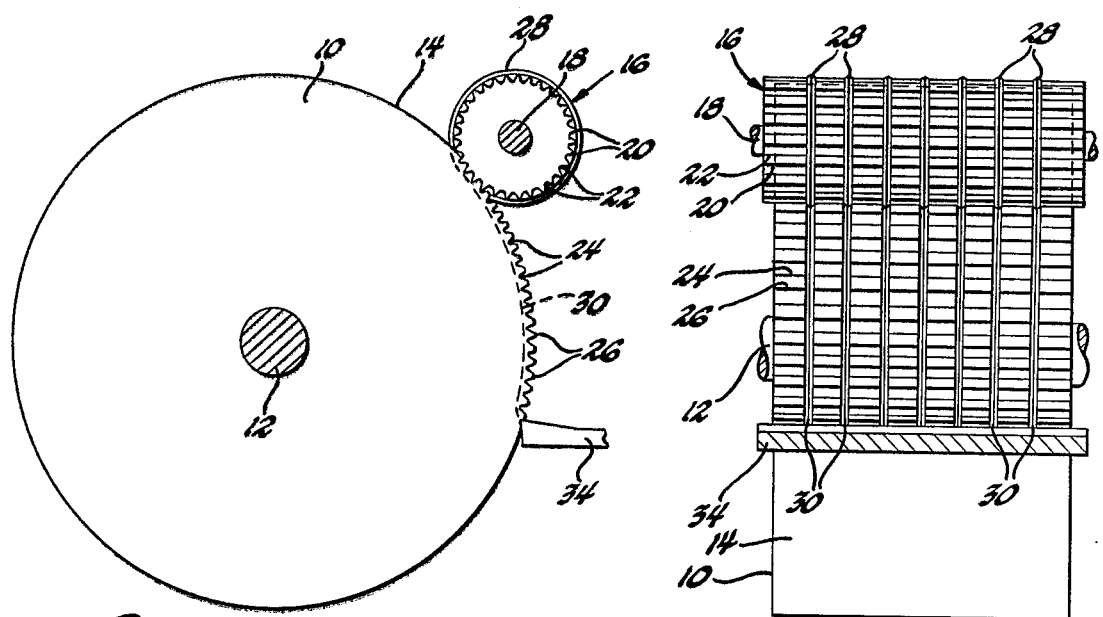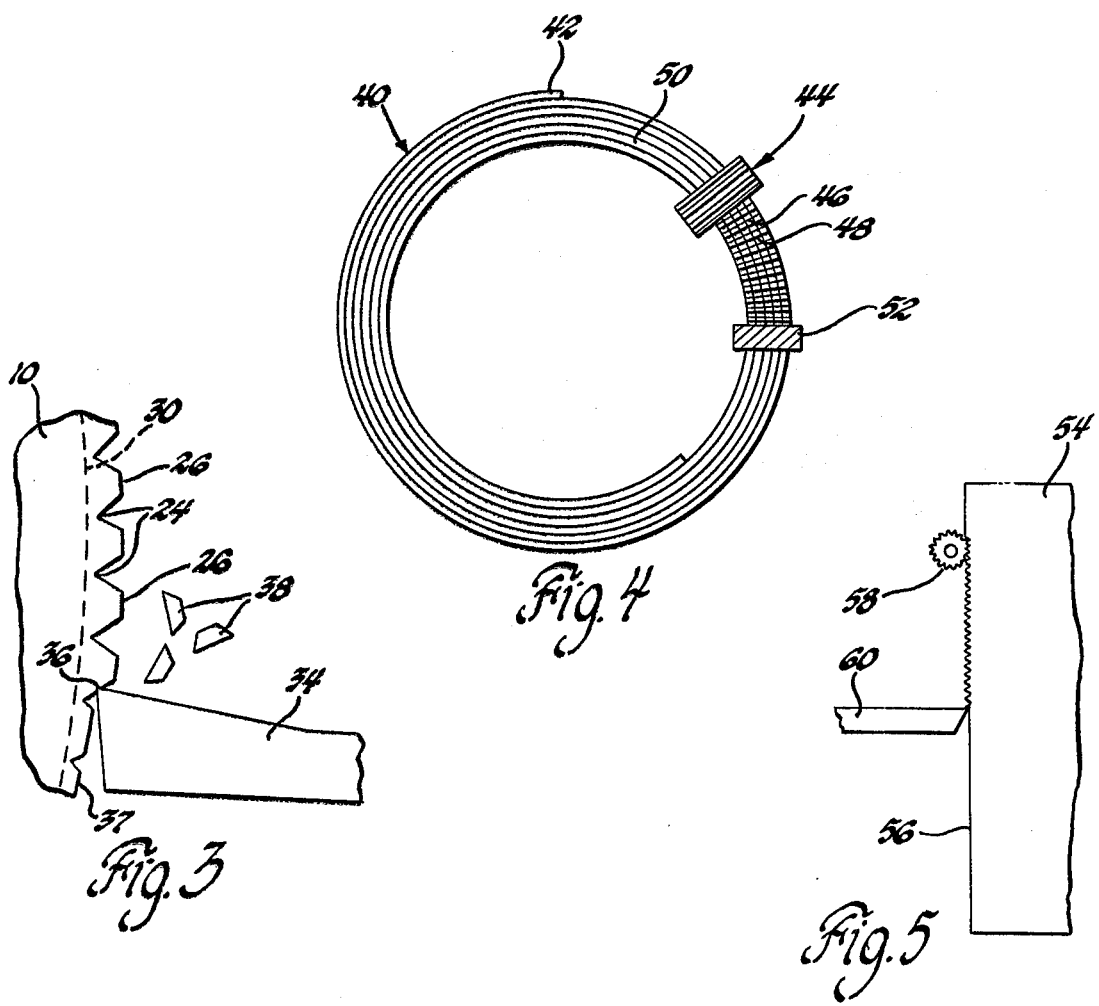

PROCESS FOR MAKING METAL FIBERS

This invention relates to making metal fibers. More specifically, this invention relates to a method in which uniformly sized metal fibers may be continuously formed and shaved from the surface of a suitable metal workpiece.

Short metal fibers are used as filler to improve the physical properties of materials such as synthetic resins and elastomers and structural concrete. For example, short steel fibers are being used as a reinforcing filler in automobile brake linings. The metal filler improves brake performance and extends the service life of the linings. In the past, short metal fibers have been made by methods such as hammer-milling steel wool fibers, and chopping metal wire. Hammer-milling produces fibers of various uncontrollable sizes, some either too short or too long to be useful, and both processes are relatively expensive because they start with fiber or wire stock. Therefore, it is desirable to have an economical process for manufacturing metal fibers of desired uniform or other predetermined sizes.

It is an object of this invention to provide an improved method of forming uniformly sized metal fibers particularly suitable for use in fiber reinforced composite materials. It is a further object of the invention to provide a method of easily and continuously forming and shaving such fibers from an ordinary stock metal workpiece. A more specific object is to make such fibers from coils of metal sheet or solid cylindrical metal billets.

In accordance with a preferred embodiment of the invention, these and other objects are accomplished by employing a suitable workpiece, such as a cylindrical billet of a desired metal. The surface of the workpiece is knurled to form series of alternate ridges and depressions. The length of the ridges corresponds to the desired length of the fibers and the width of the ridges corresponds to the desired width. The depressions are formed to a depth at least as great as the desired fiber thickness. Depending upon the knurled pattern, fibers of uniform or mixed sizes will be produced. The fibers are made by shaving the ridges from the surface. The knurling and shaving steps can be carried out continuously by rotating the workpiece and advancing the knurling and shaving tools. As the fibers are shaved from the workpiece its size is commensurately reduced until it becomes too small for further processing.

These and other objects and advantages of my invention will be more fully appreciated and understood from a detailed description thereof which follows. Reference will be made to the drawings in which:

FIG. 1 is an end elevational view of a solid cylindrical metal billet with knurling and shaving tools shown;

FIG. 2 is a front elevational view of the knurling tool, knurled billet and shaving tool of FIG. 1;

FIG. 3 shows an enlarged sectional view of a surface portion of a knurled billet of the type depicted in FIG. 1 showing a shaving tool in place and shaved metal fibers;

FIG. 4 is an end elevation view depicting another preferred embodiment of the invention comprising a coiled metal sheet workpiece with knurling and cutting tools; and FIG. 5 is an elevational view of a solid metal billet with knurling and cutting tools.

With reference to FIG. 1, a solid, cylindrical metal billet 10, rotatable around its cylindrical axis 12 is viewed from one end. In a preferred embodiment of the invention metal fibers are formed at the cylindrical surface 14 of such a billet.

To make the fibers, a knurling tool 16 is pressed against the surface 14 of the billet 10 as it rotates around its axis 12. The generally cylindrical knurling tool 16 rotates in the opposite direction around its own cylindrical axis 18 to knurl the surface 14 of the billet 10. The working surface of the knurling tool 16 comprises a pattern of ridges 20 and depressions 22. The billet 10 and knurling tool 16 rotate against each other with sufficient force to cause the ridges on the knurling tool to impress depressions 24 on the surface 14 of the billet 10. Concurrently, the depressions 22 on the knurling tool 16 form ridges 26 on the surface of billet 10 between the depressions 24. Obviously, the knurling tool 16 must be harder than the workpiece 10.

Referring now to FIG. 2, the pattern of ridges 26 and depressions 24 formed on the surface of the billet 10 by knurling tool 16 is seen. The ridges 28 on knurling tool 16 form the depressions 30 on the surface of the billet. As can be seen from the pattern on the surface of the workpiece as shown in FIG. 2, the width of the fibers is determined by the distance between the depressions 24 and their length by the distance between the depressions 30. Although a single knurling tool 34 is shown in FIG. 2, separate tools may be used to form the horizontally depicted axial ridges 26 and depressions 24 and the vertically depicted circumferential depressions 30.

Referring to FIG. 3, the fibers 38 are made by shaving the ridges 26 off the knurled surface of the workpiece such as the knurled billet of FIG. 1. The shaving tool 34 is positioned so that the cutting edge 36 cuts at a depth close to but not greater than the depth of the depressions formed on the working surface. The fibers 38 so produced are relatively uniform in size because their length and width correspond to the length and width of the ridges and their thickness corresponds to the shaving depth. Shaving the ridges 26 exposes a new working surface 37 which can be knurled and shaved to make more fibers.

In a preferred embodiment of the invention steel fibers were made for a composite automotive brake lining comprising by weight about 50% steel fibers, 10% iron powder, 20% graphite and 20% of a phenolic resin binder. A cylindrical billet about 6 inches in diameter and 4 inches long (like that shown in FIG. 1) of 12L14 steel, a leaded, free cutting, low carbon steel was knurled on its cylindrical surface with a hardened steel tool to form depressions spaced about 0.005 inch apart and 0.07 inch long. The depth of the depressions was approximately 0.005 inch. The ridges were shaved at a depth of about 0.003 inch to form the fibers thereby reducing the diameter of the steel billet. With each turn of the billet the knurling tool was advanced towards the center of the billet so that the depth of the knurled depressions formed on the surface during the next knurling step remained constant. The shaving tool was advanced in a similar manner with each turn of the billet to produce fibers having a uniform thickness.

As might be expected, after repeated knurling and shaving cycles the steel billet may become work hardened. If this occurs the workpiece can be annealed to restore its workability.

FIG. 4 shows another preferred embodiment of the invention. The workpiece 40 comprises a coiled metal sheet 42, which is mounted by means not shown to rotate about the cylindrical axis of the coil. A knurling tool 44 is positioned at the end or edge of the workpiece 40 to form generally radial depressions 46 and ridges 48 on an end surface 50 of the coil 40. The distance between the depressions 46 corresponds to the length of the finished fibers, and the gauge of the metal sheet 42 corresponds to their desired width. As in the above preferred embodiment, the depth of the depression formed on the working surface of the workpiece 40 must be at least as deep as the desired fiber thickness. The fibers are formed by shaving the knurled surface at the desired depth with a suitable tool 52. The knurling and shaving tools are advanced axially to the workpiece as its width is decreased by successive fiber shaving operations to assure that the depth of the knurled depressions and the thickness of the shaved fibers remain constant.

A coil of 1008 steel was knurled and shaved as shown at FIG. 4 to make fibers for filling automotive brake liners as described above.

Referring to FIG. 5, in another preferred embodiment, a generally rectangular metal billet or strip 54 having a flat working surface 56 is repeatedly knurled with a suitable knurling wheel 58 and shaved with a suitable tool 60 to form fibers of a desired size.

Although the invention has been described using steel as the stock metal it will be appreciated that fibers can be made from any metal which can be knurled and shaved. For example, stainless steel, copper, brass or aluminum fibers can be formed by the same process. As would be apparent to a person skilled in the art the machining rates and choice of tool materials depend on the type of metal to be worked and can be chosen accordingly.

While my invention has been disclosed in terms of specific embodiments thereof, it will be appreciated that other forms could readily be adapted by one skilled in the art. Accordingly, the scope of my invention is to be considered limited only by the following claims.

I claim:

1. A method of making metal fibers of predetermined size comprising;
   impressing a knurled pattern on a working surface of a metal workpiece the pattern comprising a series of alternate ridges and depressions, the length and width of said ridges corresponding respectively to the desired length and width of said fibers and the depth of said depressions being at least as great as the desired thickness of said fibers, and
   shaving said ridges from said working surface at a suitable depth to form said fibers having the desired thickness and to expose a new working surface.

2. A method of making metal fibers of predetermined size from a roll of tightly coiled metal sheet comprising;
   knurling an end surface of said roll to form a series of radial spaced apart ridges and depressions, the gauge of said sheet corresponding to the desired width of said fibers, the depth of said depressions being at least as great as the desired thickness of said fibers, said depressions being spaced apart to correspond to the desired length of said fibers,
   shaving said ridges from said sheet at a suitable depth to form fibers having the desired thickness, and
   repeatedly knurling and shaving the shaved end surface of said roll to make additional fibers, commensurately decreasing the size of said roll.

3. A method of making metal fibers of predetermined size from a billet of metal comprising;
   knurling a working surface of said billet to form a series of alternate ridges and depressions, the length and width of said ridges corresponding respectively to the desired length and width of said fibers and the depth of said depressions being at least as great as the desired thickness of said fibers,
   shaving said ridges from said surface at a suitable depth to form fibers having the desired thickness, and
   repeatedly knurling and shaving the shaved working surface of said billet to make additional fibers.

4. A method of making metal fibers of predetermined size from a generally cylindrically shaped metal billet comprising;
   knurling the cylindrical surface of said billet to form a series of alternate ridges and depressions, the length and width of said ridges corresponding respectively to the desired length and width of said fibers, and the depth of said depressions being at least as great as the desired thickness of said fibers,
   shaving said ridges from said surface at a suitable depth to form fibers having the desired thickness,
   repeatedly knurling and shaving the shaved working surface of said billet to make additional fibers, commensurately decreasing the size of said billet.

* * * * *